US009610892B1

(12) United States Patent
Salter et al.

(10) Patent No.: US 9,610,892 B1
(45) Date of Patent: Apr. 4, 2017

(54) INFRARED BIN LIGHTING

(71) Applicant: Ford Global Technologies, LLC, Dearborn, MI (US)

(72) Inventors: Stuart C. Salter, White Lake, MI (US); Pietro Buttolo, Dearborn Heights, MI (US); Cornel Lewis Gardner, Romulus, MI (US); Kristopher Kotenko, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/867,207

(22) Filed: Sep. 28, 2015

(51) Int. Cl.
*B60Q 3/06* (2006.01)
*B60Q 3/02* (2006.01)
*H05B 37/02* (2006.01)

(52) U.S. Cl.
CPC .......... *B60Q 3/022* (2013.01); *B60Q 3/0293* (2013.01); *H05B 37/0227* (2013.01)

(58) Field of Classification Search
CPC ... B60Q 3/022; B60Q 3/0293; H05B 37/0227
USPC ............ 315/77, 84; 362/488, 154–156
See application file for complete search history.

(56) References Cited

U.S. PATENT DOCUMENTS

| 6,222,442 | B1* | 4/2001 | Gager | E05B 83/16 307/10.1 |
| 9,113,518 | B2* | 8/2015 | Dobbins | H05B 33/0854 |
| 2008/0219017 | A1 | 9/2008 | Cruickshank | |
| 2015/0274069 | A1* | 10/2015 | Cuddihy | B60Q 3/022 315/77 |

FOREIGN PATENT DOCUMENTS

WO 2011071891 A1 6/2011

\* cited by examiner

*Primary Examiner* — Daniel D Chang
(74) *Attorney, Agent, or Firm* — Vichit Chea; Price Heneveld LLP

(57) ABSTRACT

A lighting apparatus for a vehicle storage compartment is disclosed. The lighting apparatus comprises a sensor configured to generate a detection signal and a controller communicatively coupled to the sensor. The controller is configured to interpret a detection signal and activate a first lighting mode in response to the detection signal communicating a closure of the storage compartment being open. The controller is further configured to activate a second lighting mode in response to the detection signal communicating that an object is proximate in opening of the storage compartment.

20 Claims, 7 Drawing Sheets

INFRARED BIN LIGHTING

FIELD OF THE INVENTION

The present invention generally relates to a lighting apparatus and more specifically relates to a lighting apparatus for a vehicle storage compartment.

BACKGROUND OF THE INVENTION

Modern vehicles utilize various systems to improve convenience and ease of use. Some vehicles may utilize various illumination devices to enable occupants to more easily store and/or organize belongings in various storage compartments.

SUMMARY OF THE INVENTION

According to one aspect of the present invention, a lighting apparatus for a vehicle storage compartment is disclosed. The lighting apparatus comprises a sensor configured to generate a detection signal and a controller communicatively coupled to the sensor. The controller is configured to interpret a detection signal and activate a first lighting mode in response to the detection signal detecting a closure of the storage compartment being open. The controller is further configured to activate a second lighting mode in response to the detection signal detecting an object is proximate in opening of the storage compartment.

According to another aspect of the present invention, a lighting apparatus for a vehicle storage compartment is disclosed. The lighting apparatus comprises at least one sensor configured to generate a detection signal. The lighting apparatus further comprises a controller communicatively coupled to the sensor and configured to interpret a detection signal received from the sensor. In response to the detection signal detecting a closure of the storage compartment being open, the controller is configured to activate a first lighting mode. In response to the detection signal detecting that an object is proximate in opening of the storage compartment, a controller is configured to activate a second lighting mode.

According to yet another aspect of the present invention, a method for controlling a lighting apparatus for a vehicle is disclosed. The method comprises identifying an orientation of a closure of the compartment. In response to identifying the orientation of the closure being open, the method may continue to activate a light source to emit a first emission. The method further comprises identifying a presence of an object proximate an opening of the compartment. In response to identifying the presence of the object, the method may selectively activate the light source to emit a second emission.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The terms first, second, third, etc. as utilized herein may provide designations in reference to the figures for clarity. For example, a first portion and a second portion may be referred to in some implementations and only a second portion may be referred to in some additional implementations. Such designations may serve to demonstrate exemplary arrangements and compositions and should not be considered to designate a specific number of elements or essential components of any specific implementation of the disclosure, unless clearly specified otherwise. These designations, therefore, should be considered to provide clarity in reference to various possible implementations of the disclosure, which may be combined in various combinations and/or individually utilized in order to clearly reference various elements of the disclosure.

Figure 1:
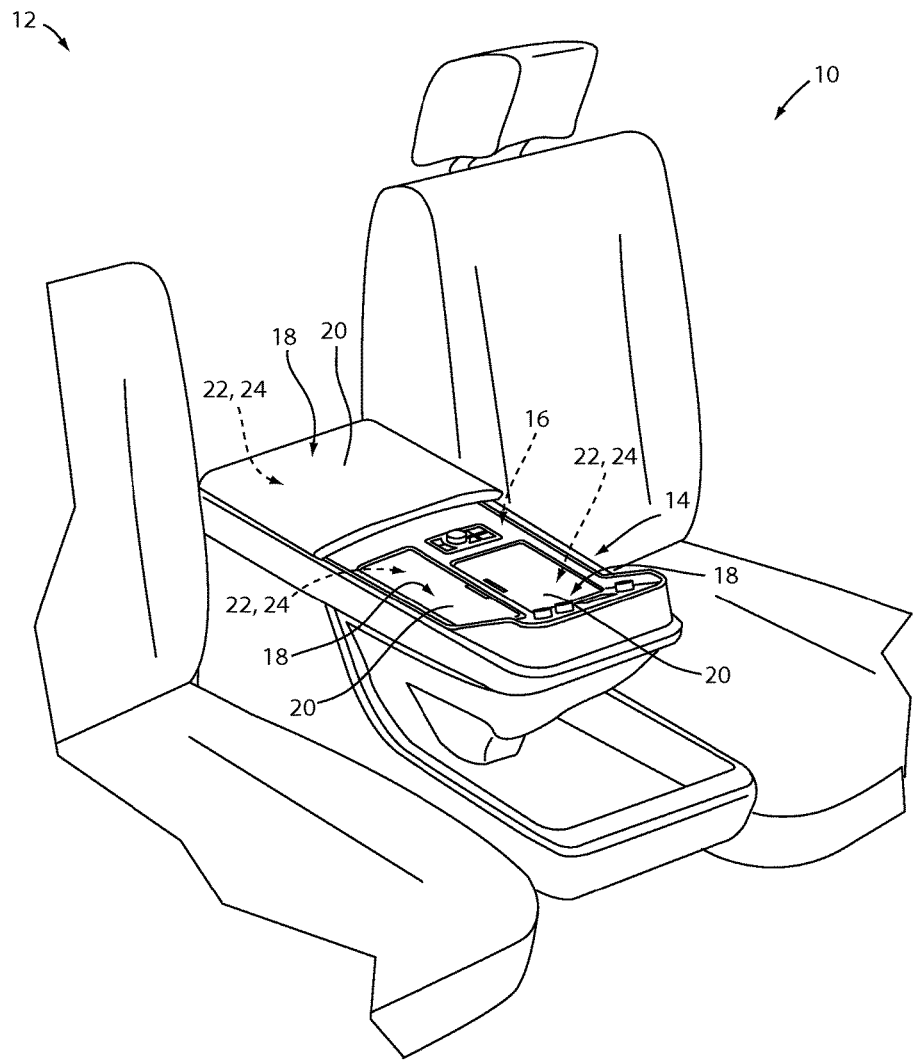
FIG. 1 is a projected view of a lighting apparatus for a vehicle storage compartment.

Referring now to FIG. 1 a projected view of a passenger compartment 10 for a vehicle 12 is shown demonstrating a storage compartment 14. The storage compartment 14 may comprise a lighting apparatus 16 as demonstrated in FIG. 2. The lighting apparatus 16 is configured to selectively activate at least one light source 32. The at least one light source 32 may be configured to illuminate at least one storage tray 18 of the storage compartment 14 to provide for at least one of a task light and/or an ambient light.

In an exemplary embodiment, the lighting apparatus 16 may comprise at least one sensor configured to generate a detection signal. The detection signal may be communicated to a controller 34 configured to control the at least one light source. In response to receiving the detection signal, the controller 34 may selectively activate the at least one light source in a plurality of lighting modes. For example, the controller may activate the at least one light source in a first lighting mode in response to the detection signal communicating a closure 20 of the storage tray 18 oriented in an open position.

The first lighting mode may correspond to the closure 20 of the storage compartment being orientated in the open position and the at least one light source outputting a first emission of light into the passenger compartment 10. The first emission may correspond to ambient light configured to provide a gentle illumination or glow in the passenger compartment 10. The second lighting mode may correspond to a utility light configured to illuminate a storage cavity 24 formed by the storage tray 18. In this configuration, the controller may utilize the detection signal from at least one sensor to selectively illuminate at least a portion of the storage compartment 14.

Additionally, the controller 34 may be configured to activate the at least one light source 32 in a second lighting mode. The controller 34 may selectively activate the second lighting mode in response to the detection signal detecting and communicating that an object is proximate an opening 22 of the storage tray 18. The second lighting mode may correspond to a task light in the form of a second emission configured to illuminate the storage cavity to improve an accessibility and visibility of items that may be stored therein. The combination of the selective activation of the first emission and the second emission may provide for the controller to provide improved accessibility to the storage compartment 14 while also providing for an improved appearance.

In some embodiments, the controller may also identify the closure 20 in a closed position based on the detection signal. In the closed position it may be desirable for the controller to deactivate the at least one light source such that the lighting apparatus 16 may be hidden or concealed. In this configuration, the controller of the lighting apparatus 16 may be operable to selectively activate or deactivate the at least one light source to control a plurality of lighting modes. The specific embodiments described herein demonstrate exemplary configurations of the lighting apparatus 16. As such, it shall be understood that various embodiments of the disclosed subject matter are provided herein without departing from the spirit of the disclosure.

Figure 2A:
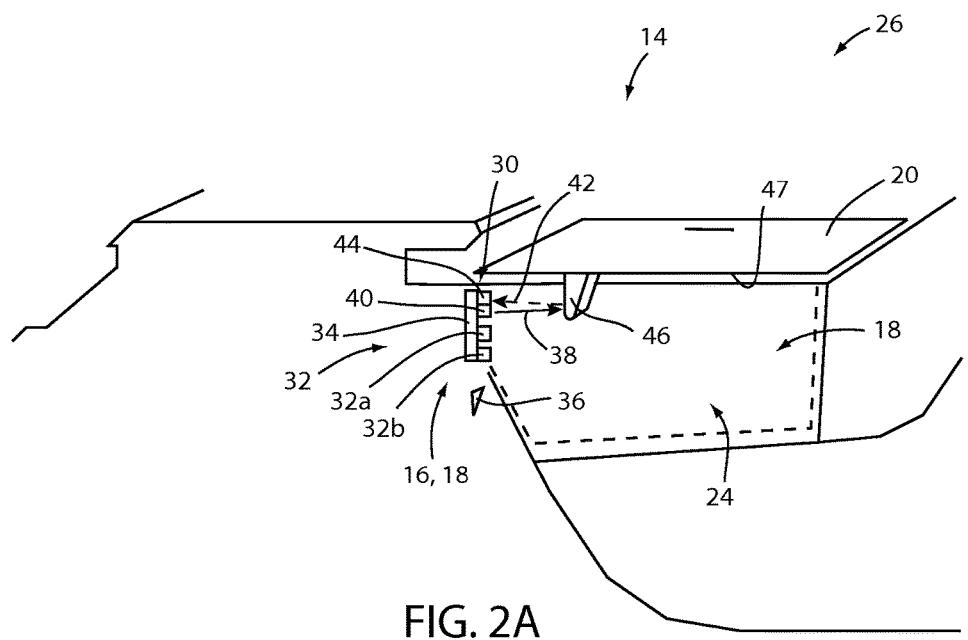
FIG. 2A is a detailed side view of a storage compartment comprising a lighting apparatus having a closure orientated in a closed position.
Figure 2B:
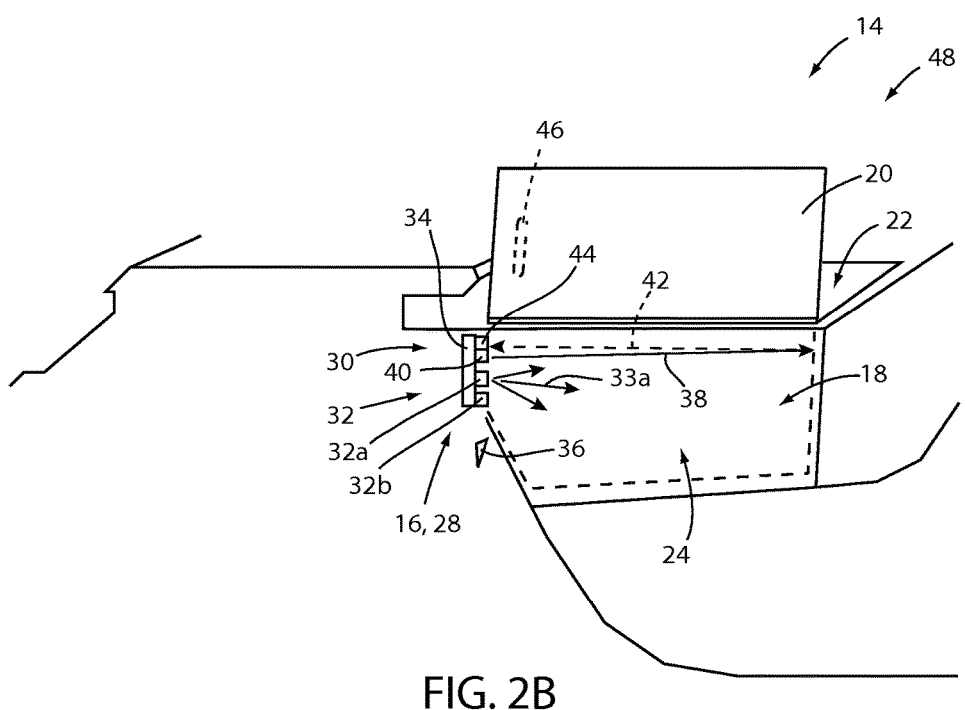
FIG. 2B is a detailed side view of a storage compartment comprising a lighting apparatus demonstrating a closure orientated in an open position.

As shown in FIG. 1, the closure 20 of the storage tray 18 is shown in a closed orientation such that the opening 22 and the storage cavity 24 are hidden behind the closure 20. FIGS. 2A and 2B demonstrate the closure 20 in a closed position and an open position. Additionally, FIG. 3C demonstrates a mode or state of the lighting apparatus 16 in response to the controller receiving the detection signal corresponding to a detection of an object. Though specific examples of the lighting apparatus are discussed herein, it may be understood that such examples correspond to exemplary embodiments of the disclosed subject matter that should not be considered limiting.

Referring to FIG. 2A, a detailed side view of the storage tray 18 is shown demonstrating the closure 20 oriented in a closed position 26. In some embodiments, the lighting apparatus 16 may comprise a circuit 28 or control circuit comprising the at least one sensor 30, the at least one light source 32, and the controller 34. The circuit 28 may be disposed proximate an interior wall 36 formed by the storage tray 18. In this configuration, the at least one sensor 30, may be configured to emit a sensory emission 38 from an emitter 40 and receive a reflected emission 42 via a receiver 44. In an exemplary embodiment, the at least one sensor 30 may correspond to an optical sensor, and in some embodiments, the at least one sensor 30 may correspond to an infrared sensor formed by the emitter 40 and the receiver 44.

The at least one light source 32 may correspond to any form of light source. For example, the at least one light source 32 may correspond to fluorescent lighting, light emitting diodes (LEDs), organic LEDs (OLEDs), polymer LEDs (PLEDs), solid state lighting, or any other form of light sources. In some embodiments, the at least one light source may correspond to a first light source 32a and a second light source 32b. The first light source 32a may be configured to emit a first emission 33a to illuminate the storage tray 18 in an ambient light configuration as shown in FIG. 3B. The second light source 32b may be configured to emit the second emission 33b to illuminate the storage tray in a task lighting configuration as shown in FIG. 3C. In this configuration, the controller 34 may utilize the detection signal from at least one sensor to selectively illuminate at least a portion of the storage compartment 14.

In an exemplary embodiment, the ambient light of the first emission 33a may correspond to a less intense or less bright light than the task light of the second emission 33b. Additionally, the first emission 33a may correspond to at least one different wavelength of light than the second emission 33b. For example, the first emission 33a may correspond to an emission of light having a color configured to generate a corresponding colored, ambient glow from the storage tray 18. In this configuration, the first light source 32a may correspond to a light source configured to emit one or more colors of light, for example a red, green, blue (RGB) LED light source. The second emission 33b may correspond to a significantly white light configured to illuminate the storage tray 18. In this way, the controller 34 may be configured to selectively illuminate and control a color of light illuminating the storage tray 18 in response to the detection of an orientation of the closure 20 and a detection of a presence of an object.

In order to ensure that the controller 34 of the lighting apparatus 16 is operable to differentiate among various states (e.g. the closure 20 open or closed, and/or the presence of an object); the closure 20 may be equipped with a reflective feature 46. As demonstrated in FIG. 2A, when the closure 20 is orientated in the closed position 26, the sensory emission 38 is reflected from the reflective feature 46 as the reflected emission 42. As discussed in reference to FIG. 3A, the detection signal may demonstrate an average magnitude which may be significantly stable and correspond to a higher magnitude than demonstrated in response to the closure 20 orientated in an open position and/or an object proximate the opening 22. In this way, the controller 34 may consistently identify the closure 20 orientated in the closed position 26.

The reflective feature 46 may correspond to a leg or tab in connection with an interior surface 47 of the closure 20 configured to extend into at least a portion of the storage cavity 24. In this configuration, the reflective feature 46 may correspond to an obstruction configured to reflect the sensory emission 38 at least partially back to the receiver 44 as the reflected emission 42. As such, the reflective feature may comprise a reflective surface configured to reflect the sensory emission 38, but may not be required to correspond to a mirrored surface, and may facilitate the reflective function of the sensory emission 38 by being at least partially reflective and somewhat glossy. As utilized herein, the term glossy may refer to a surface that has a smooth and at least somewhat reflective surface as opposed to a matte surface that may diffuse and limit the intensity of the reflected emission 42.

Referring now to FIG. 2B, a detailed side view of the storage tray 18 demonstrating the closure 20 in an open position 48 is shown. In the open position 48, the sensory emission 38 may be emitted outward from the emitter 40 into the storage cavity 24 such that the reflected emission 42 is returned to the receiver 44. As discussed in reference to FIG. 3B, a magnitude of the detection signal corresponding to the reflected emission 42 may be less than the magnitude of the detection signal corresponding to the closure 20 oriented in the closed position 26. In this way, the controller 34 may receive the detection signal and analyze various characteristics of the detection signal, for example, the magnitude, in order to selectively activate the at least one light source 32. Examples of characteristics of the detection signal that may be utilized by the controller 34 to control a state or lighting mode of the lighting apparatus 16 are discussed in further detail in reference to FIGS. 3A-3C, FIG. 4, and FIG. 5.

Figure 2C:
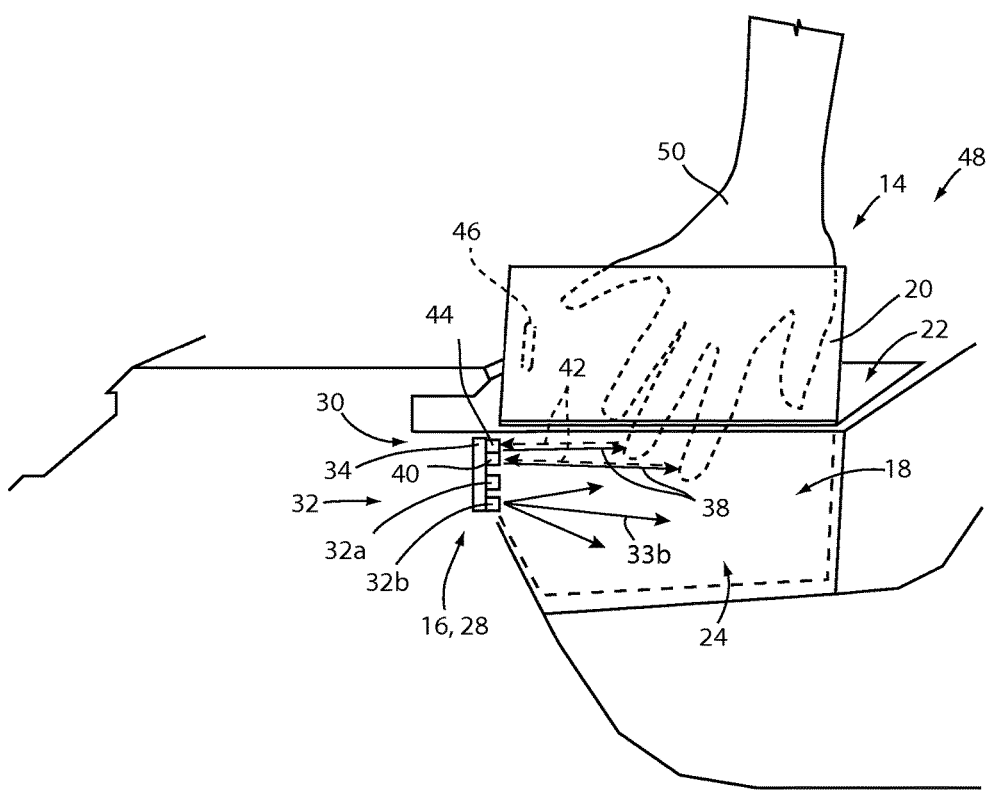
FIG. 2C is a detailed side view of a storage compartment comprising a lighting apparatus demonstrating an object proximate the lighting apparatus.

Referring now to FIG. 2C, the storage tray 18 is shown demonstrating the closure 20 oriented in the open position 48. An object 50, for example, a hand or portion of an occupant of the vehicle 12 is further shown proximate the opening 22 formed by the storage tray 18. In this configuration, the sensory emission 38 output from the emitter 40 may be reflected from the object 50 such that the reflected emission 42 is reflected back to the receiver 44. As demonstrated in FIG. 3C, a detection signal corresponding to the reflected emission 42 being reflected from the object 50 may have a magnitude that is less than the detection signal corresponding to the closure 20 oriented in the closed position 26. Additionally, the detection signal may correspond to a signal having a magnitude higher than the detection signal corresponding to the closure 20 oriented in the open position 48. The detection signal corresponding to the object 50 may also demonstrate a variation in magnitude that is greater than a variation corresponding to the closure 20 oriented in the closed position 26 or the open position 48. As described herein, the disclosure provides for a lighting apparatus operable to identify and differentiate a closure 20 oriented in a closed position 26 and an open position 48, as well as identify a presence of an object 50 in proximity to an opening 22.

Referring again to FIGS. 3A and 3B the detection signal 52 is shown corresponding to the closed position 26 as the detection signal 52*a* and the open position 48 as detection signal 52*b*. Additionally, in FIG. 3C, the detection signal 52 is shown in response to the object 50 being detected in the storage cavity 24 as detection signal 52*c*. For clarity, the detection signal corresponding to the closure 20 oriented in the closed position 26 may be referred to as a first signal state 54. The detection signal corresponding to the closure 20 of the storage tray 18 oriented in the open position 48 may be referred to as a second signal state 56. The detection signal corresponding to the object 50 located proximate to or extending into storage cavity 24 may be referred to as a third signal state 58. Based on various characteristics of each of the detection signal states 54, 56, and 58, the controller may utilize the detection signal to identify a plurality of conditions or the storage tray and control the at least one light source 32 accordingly.

Though the numeric identifiers of first, second, and third are utilized to describe various states of the detection signal, designations of the emissions, etc., and as such, it may be understood that such identifiers are utilized for clarity in reference to the figures. These identifiers should not be considered or interpreted to or respond to identifiers that may be utilized in the claims. For example, an identifier of a first signal or first state as discussed in the claims may correspond to a different state than referred to in reference to a specific figure.

Figure 3A:
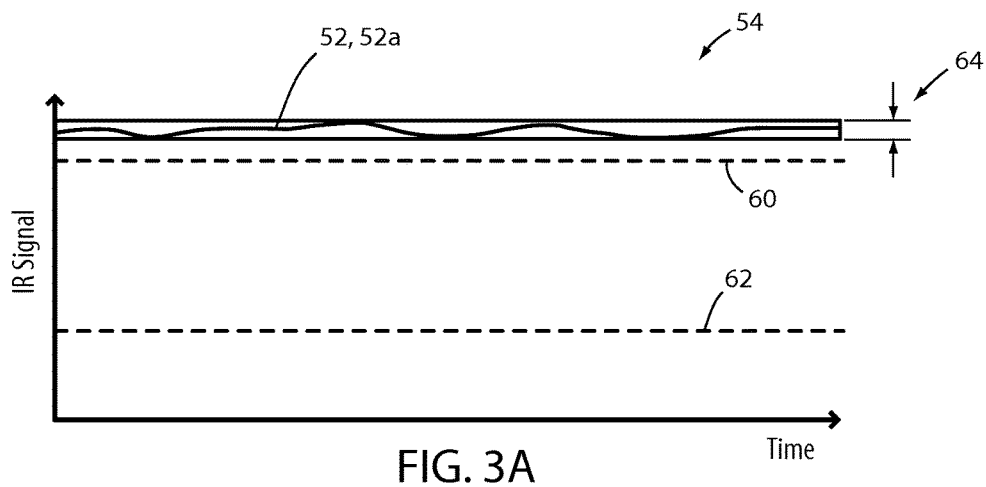
FIG. 3A is a plot of a detection signal corresponding to a closure of a storage compartment in a closed position.
Figure 3B:
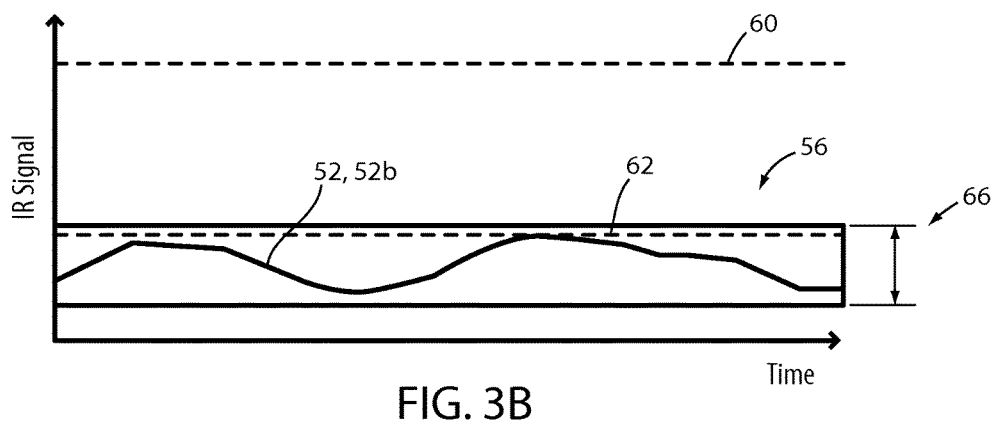
FIG. 3B is a plot of a detection signal corresponding to a closure of a storage compartment oriented in an open position.
Figure 3C:
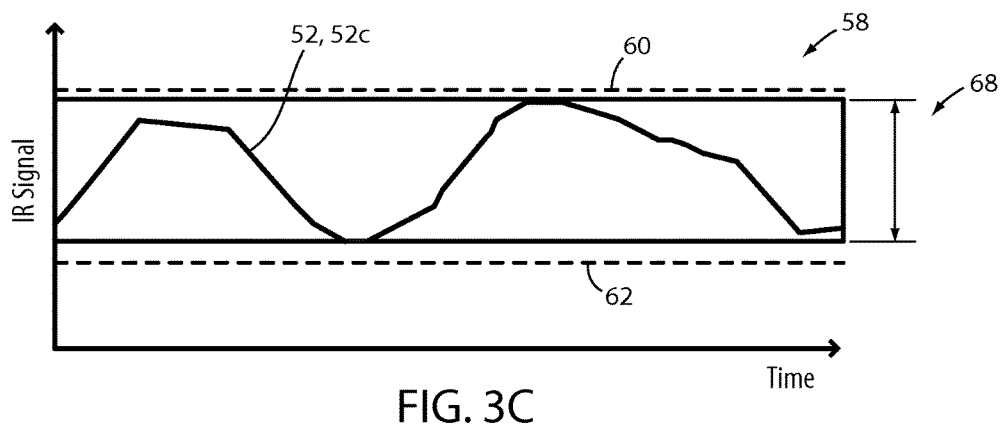
FIG. 3C is a plot of a detection signal corresponding to an object present proximate an opening of the storage compartment.

In FIG. 3A, the detection signal 52*a* is shown corresponding to the closure 20 oriented in the closed position 26. Based on the magnitude and variation of the detection signal 52*a*, the controller 34 is configured to identify the first signal state 54. For example, the controller 34 may identify the first signal state 54 as having a magnitude or average magnitude that is greater than a first predetermined threshold 60. The first predetermined threshold 60 may be greater than a magnitude or average magnitude of the detection signal 52 in the second signal state 56 and/or the third signal state 58. In this way, the controller may identify the first signal state 54 based on the magnitude or average magnitude of the detection signal 52.

Referring to FIG. 3B, the detection signal 52 is shown corresponding to the second signal state 56. The controller 34 may identify the second signal state 56 as having a magnitude or average magnitude that is less than the first predetermined threshold 60, and less than a second predetermined threshold 62. The second predetermined threshold 62 may be greater than a magnitude or average magnitude of the detection signal 52 in the second signal state 56. Also, the magnitude or average magnitude of the detection signal 52 in the second signal state 56 may be less than the magnitude or average magnitude of the detection signal 52 in the first signal state 54 and/or the third signal state 58. The magnitude of the detection signal 52 in the first signal state 54 may be greater than the magnitude in the third signal state 58, and the magnitude of the detection signal 52 in the third signal state 58 may be greater than the magnitude in the second signal state 56. As such, by identifying the magnitude of the detection signal 52 corresponding to each of the signal states 54, 56, and 58, the controller 34 is operable to control the at least one light source 32 as discussed herein.

Referring to FIG. 3C, the detection signal 52 is shown corresponding to the third signal state 58. The controller 34 may identify the third signal state 58 as having a magnitude or average magnitude that is less than the first predetermined threshold 60, and greater than a second predetermined threshold 62. The second predetermined threshold 62 may be greater than a magnitude or average magnitude of the detection signal 52 in the second signal state 56 and less than the magnitude or average magnitude of the detection signal 52 in the first signal state 54 and/or the third signal state 58. In this way, the controller may identify the third signal state 58 based on the magnitude or average magnitude of the detection signal 52.

The controller 34 may further be configured to identify or distinguish a state of the detection signal 52 in each of the first signal state 54, the second state 56, and the third signal state 58 based on a noise magnitude or a variation of the detection signal 52. That is, in some embodiments, the controller 34 may be configured to identify a variation of the detection signal 52 to distinguish whether the closure 20 oriented in the closed position 26 and an open position 48, as well as identify a presence of the object 50 in proximity to the opening 22. As discussed herein, the noise level or variation may refer to an extent or magnitude of a change in the detection signal 52 that may be detected by the controller 34.

For example, the first signal state 54 may have a first variation 64, the second signal state 56 may have a second variation 66, and the third signal state 58 may have a third variation 68. The first variation 64 may correspond to a lowest variation relative each of the three variations 64, 66, and 68. The second variation 66 may be less than the third variation 68 and greater than the first variation 64. As such, the first variation 64 may be less than the second variation 66, which is less than the third variation 68. By identifying the variation of the detection signal 52, the controller 34 may be configured to identify a state of the detection signal 52 to control the at least one light source 32 as discussed herein.

Figure 4:
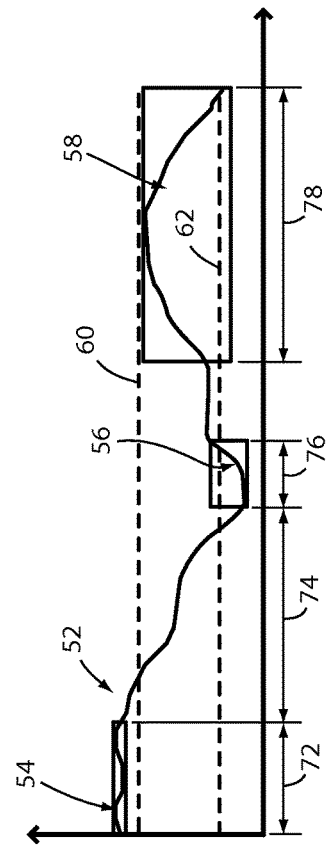
FIG. 4 is a plot of a detection signal demonstrating a transition of the detection signal in response to a closure of the storage compartment being moved from a closed position to an open position.

Referring now to FIG. 4, a plot of the detection signal 52 is shown demonstrating a transition of the detection signal 52. The transition demonstrated in FIG. 4 may be in response to the closure 20 of the storage compartment 14 being moved from the closed position 26 to the open position 48. As shown, the detection signal 52 may be identified by the controller 34 as corresponding to the first signal state 54 in response to the closure 20 being oriented in the closed position 26 during a first duration 72. The controller 34 may be configured to identify the detection signal 52 changing from the first signal state 54 to the second signal state 56 during a closure transition 74 and corresponding to the second signal state 56 in response to the closure 20 being oriented in the open position 48 during a second duration 76.

The first duration 72 may correspond to a period of time during which the controller 34 controls the at least one light source 32 to be in an idle state where no emission is output. The second duration 76 may correspond to a period of time during which the controller 34 controls the first light source 32a to emit the first emission 33a to illuminate the storage tray 18 in an ambient light configuration. The closure transition 74 may correspond to a time interval identified by the controller 34 as occurring between the first signal state 54 and the second signal state 56. Accordingly the controller 34 may be operable to limit a false detection of the closure transition 74, by limiting an activation of the first light source 32a to a predetermined time interval.

The predetermined time interval may correspond to a range of time over which the closure transition 74 is expected to occur. For example, if the detection signal 52 is detected by the controller 34 as changing from the first signal state 54 to the second signal state 56, the controller 34 may compare the closure transition 74 to a minimum transition time and a maximum transition time. The controller 34 may be configured to activate the first emission 33a in response to the closure transition 74 being greater than the minimum transition time and less than the maximum transition time. In this way, the controller 34 may limit a false detection of the transition in response to transient signal fluctuations and long term changes in magnitude of the detection signal 52.

Figure 5:
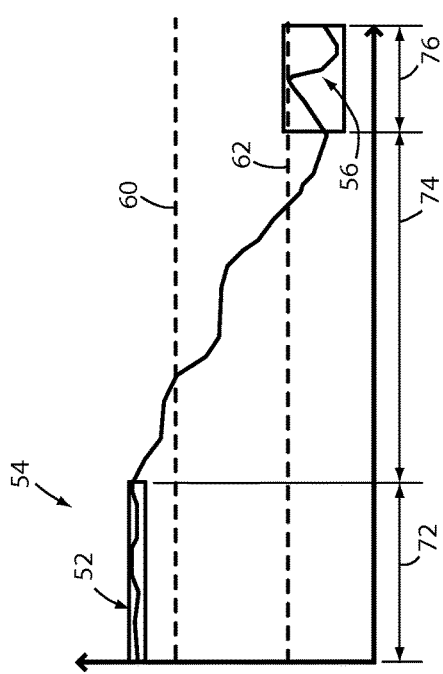
FIG. 5 is a plot of a detection signal demonstrating a transition of the detection signal in response to a closure of the storage compartment being moved from a closed position to an open position and in response to an object being detected proximate the storage compartment.

Referring now to FIG. 5, a plot of the detection signal 52 is shown demonstrating a transition of the detection signal 52. The transition demonstrated in FIG. 5 may be in response to the closure 20 of the storage compartment 14 being moved from the closed position 26 to the open position 48 and additionally to the object 50 being detected proximate the storage compartment 14. The detection signal 52 may be identified by the controller 34 as corresponding to the first signal state 54 in response to the closure 20 being oriented in the closed position 26 during the first time duration 72. The controller 34 may further be configured to identify the detection signal 52 changing from the first signal state 54 to the second signal state 56 during the closure transition 74.

The controller may also be configured to detect the second signal state 56 in response to the closure 20 being oriented in the open position 48 during a second time duration 76. The third signal state 58 may further be detected by the controller 34 in response to the object 50, for example a hand of a passenger of the vehicle 12, being proximate the opening 22 of the storage tray 18. The third signal state 58 may be detected by the controller 34 for a third time duration 78. During the third time duration 78, the controller 34 may be configured to second light source 32b to emit the second emission 33b to illuminate the storage tray 18 in a task lighting configuration. As previously discussed, the controller 34 may identify a state of the lighting apparatus 16 in response to a magnitude or average magnitude of the detection signal 52, a variation of the detection signal, and/or a transition duration of the detection signal 52 among the first signal state 54, the second signal state 56, and/or the third signal state 58. In this way, the lighting apparatus may provide for reliable controls configured to selectively activate the at least one light source.

Figure 6:
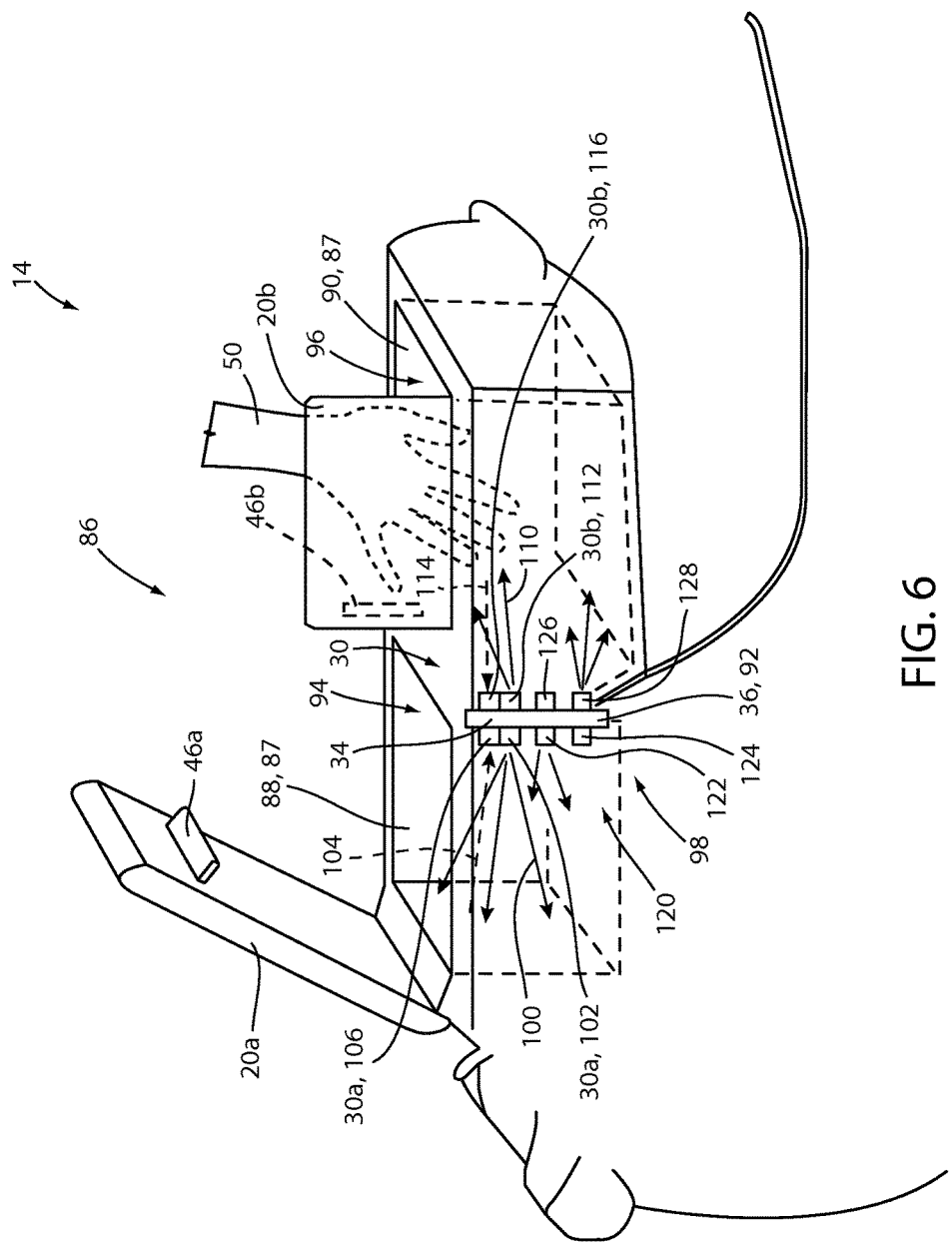
FIG. 6 is a detailed side view of a lighting apparatus comprising a plurality of storage trays.

Referring to FIG. 6, a detailed side view of a lighting apparatus 86 comprising a plurality of storage trays 87 is shown. The lighting apparatus 86 may comprise similar elements to the lighting apparatus 16, and as such, like elements are like numbered in FIG. 7 for clarity. The lighting apparatus 86 is shown comprising a first storage tray 88 and a second storage tray 90. A circuit 92 may be disposed between a first storage cavity 94 formed by the first storage tray 88 and a second storage cavity 96 formed by the second storage tray 90. For example, the circuit 92 of the lighting apparatus 86 may be disposed in or form a portion of a wall 98 disposed between the first storage tray 88 and the second storage tray 90. The circuit 92 may correspond to a printed circuit board configured to provide for a structural placement of the lighting apparatus in the wall 98 and provide for conductive communication among the various sensors and light sources discussed herein. In such a configuration, the at least one sensor 30 may correspond to a first sensor 30a and a second sensor 30b.

The first sensor 30a may be configured to emit a first sensory emission 100 from a first emitter 102 and receive a first reflected emission 104 via a first receiver 106 in the first storage tray 88. The second sensor 30b may be configured to emit a second sensory emission 110 from a second emitter 112 and receive a second reflected emission 114 via a second receiver 116 in the second storage tray 90. In this configuration, the controller 34 may be configured to receive a first detection signal from the first sensor 30a and a second detection signal from the second sensor 30b.

The controller 34 may process each of the first detection signal and the second detection signal to selectively activate a plurality of the light sources 120. The controller may interpret at least one of the magnitude and variation of the first detection signal to selectively activate a first light source 122 and a second light source 124. The first light source 122 may be configured to provide for ambient lighting of the first storage tray 88 in a first state, and the second light source 124 may be configured to provide for task lighting of the first storage tray 88. The controller 34 may selectively activate the first light source 122 and the second light source 124 in response to the first detection signal as discussed in reference to the first light source 32a and the second light source 32b, respectively.

The controller 34 may further interpret at least one of the magnitude and variation of the second detection signal to selectively activate a third light source 126 and a fourth light source 128. The third light source 126 may be configured to provide for ambient lighting of the second storage tray 90 in a first state, and the fourth light source 128 may be configured to provide for task lighting of the second storage tray 90. The controller 34 may selectively activate the third light source 126 and the fourth light source 128 in response to the second detection signal as discussed in reference to the first light source 32a and the second light source 32b, respectively. Though illustrated in the open position in FIG. 6, each of the closures 20a and 20b may incorporate the reflective features 46a and 46b, respectfully. This way, the lighting apparatus 86 may operate similar to the lighting apparatus 16 as discussed in reference to FIGS. 2-5.

Figure 7:
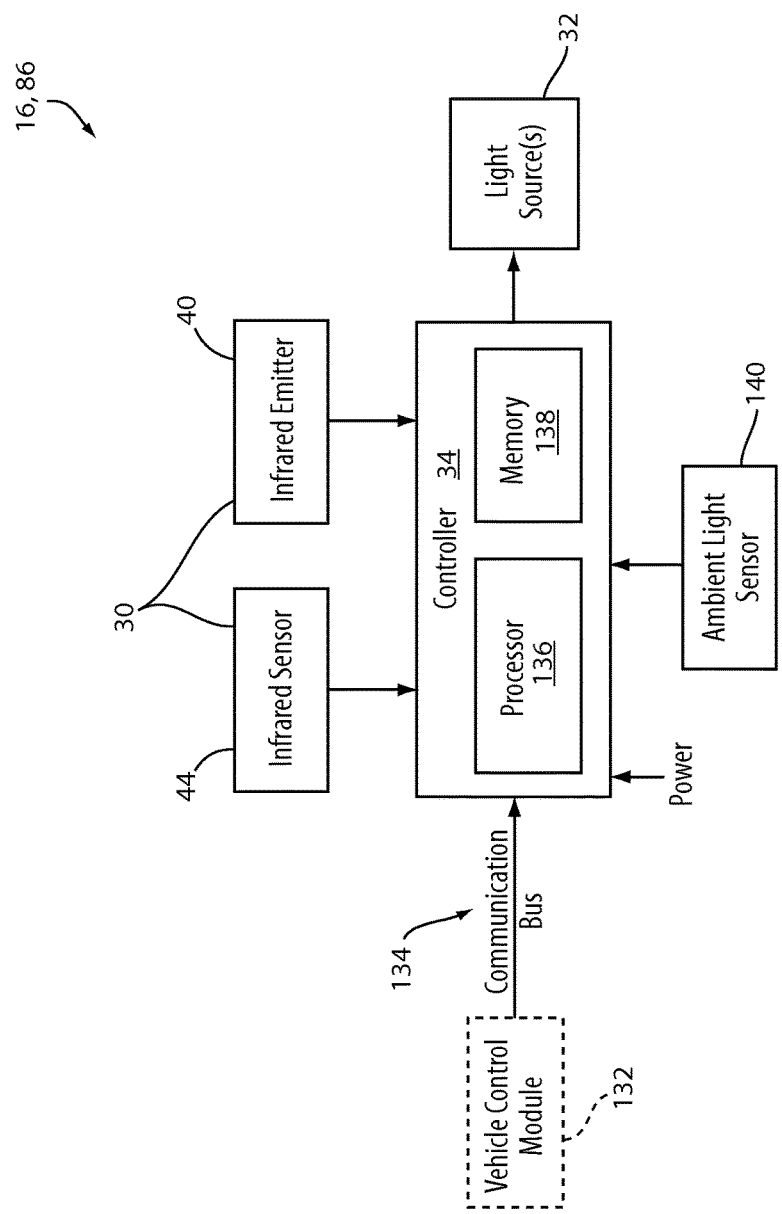
FIG. 7 is a block diagram of a lighting apparatus for a vehicle storage compartment in accordance with the disclosure.

Referring to FIG. 7, a block diagram corresponding to a lighting apparatus is shown. The lighting apparatus may correspond to the lighting apparatuses 16 and 86 and various combinations or variations thereof as discussed herein. The controller 34 may be in communication with a vehicle control module 132 via a communication bus 134 of the vehicle 12. The communication bus 134 may be configured to deliver signals to the controller 34 identifying various vehicle states. For example, the communication bus 134 may be configured to communicate to the controller 34 a drive selection of the vehicle, an ignition state, a door open or ajar status, a remote activation of the lighting apparatus 16, or any other information or control signals. Such control signals may be utilized by the controller 34 in addition to the various detection signals discussed herein to control an illumination of the light apparatus. Though the controller 34 is discussed herein, in some embodiments, the lighting apparatus may be activated in response to an electrical or electro-mechanical switch in response to a position of a closure (e.g. a door, hood, truck lid, etc.) of the vehicle 12.

The controller 34 may comprise a processor 136 comprising one or more circuits configured to receive the signals from the communication bus 134 and output signals to control the lighting apparatus 16 to control the output emissions. The processor 136 may be in communication with a memory 138 configured to store instructions to control the activation of the lighting apparatus 16. The controller 34 may further be in communication with an ambient light sensor 140. The ambient light sensor 140 may be operable to communicate a light condition, for example a level brightness or intensity of ambient light proximate the vehicle 12. In response to the level of the ambient light, the controller 34 may be configured to adjust a light intensity output from the lighting apparatus 16. The intensity of the light output from the lighting apparatus 16 may be adjusted by the controller 34 by controlling a duty cycle, current, or voltage supplied to the lighting apparatus 16.

The controller 34 may further be in communication with the at least one sensor 30. The sensor 30 may correspond to various forms of sensory devices including but not limited to resistive, infrared, capacitive, and other forms of sensors. In an exemplary embodiment, the sensor 30 may correspond to an optical sensor comprising an emitter and a receiver as discussed herein. A detection signal output from the at least one sensor 30 may correspond to an output voltage. A magnitude of the voltage of the detection signal may be identified by the controller 34 to detect whether the closure 20 is oriented in the closed position 26 or an open position 48, as well as identify a presence of the object 50 in proximity to the opening 22. In this configuration, the controller 34 may detect the object in proximity to the at least one sensor 30 to selectively activate the various light sources discussed herein. In this way, the disclosure provides for an lighting apparatus for a vehicle configured to provide an ambient lighting and a task lighting for a storage compartment.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A lighting apparatus for a vehicle storage compartment comprising:
   a closure member configured to enclose an opening of the storage compartment;
   an emitter disposed proximate the opening configured to output an emission configured to impinge upon a portion of the closure member in response to the closure oriented in a closed position;
   a sensor configured to generate a detection signal in response to identifying the emission impinging upon the portion of the closure member;
   a controller communicatively coupled to the sensor and configured to:
     interpret the detection signal;
     activate a first lighting mode in response to the detection signal detecting the closure member in an opened position; and
     activate a second lighting mode in response to the detection signal identifying the emission impinging upon the portion of the closure member.

2. The apparatus according to claim 1, wherein the controller is further configured to:
   compare the detection signal to a plurality of thresholds to identify when the storage compartment is closed.

3. The apparatus according to claim 2, wherein the controller is further configured to:
   compare the detection signal to the plurality of thresholds to identify when object is proximate the opening of the storage compartment.

4. The apparatus according to claim 1, wherein the sensor corresponds to an optical sensor.

5. The apparatus according to claim 4, wherein the optical sensor corresponds to an infrared sensor.

6. The apparatus according to claim 1, wherein the emitter corresponds to an infrared emitter disposed proximate the opening and configured to emit an infrared emission across at least a portion of the opening.

7. The apparatus according to claim 1, wherein the portion of the closure member corresponds to a protrusion configured to reflect at least a portion of the emission such that a magnitude of the detection signal is different in response to the emission impinging upon the protrusion than in response to detecting an object entering the storage compartment.

8. A lighting apparatus for a vehicle storage compartment comprising:
at least one sensor configured to generate a detection signal;
a controller communicatively coupled to the sensor and configured to:
receive the detection signal;
compare the detection signal to a compartment closed threshold and a foreign object threshold;
activate a first lighting mode in response to the detection signal being less than the compartment closed threshold and the foreign object threshold; and
activate a second lighting mode in response to the detection signal being greater than the foreign object threshold.

9. The lighting apparatus according to claim 8, wherein the at least one sensor is disposed proximate a wall of the storage compartment.

10. The lighting apparatus according to claim 9, wherein the storage compartment comprises a plurality of storage trays disposed adjacent along the wall.

11. The lighting apparatus according to claim 10, wherein the lighting apparatus comprises a circuit disposed on the wall and configured to selectively illuminate a first tray and a second tray of the plurality of storage trays.

12. The lighting apparatus according to claim 11, wherein the at least one sensor comprises a plurality of optical sensors in communication with the circuit and configured to selectively illuminate the first storage tray and the second storage tray in response to a detection of a foreign object proximate the storage compartment.

13. The lighting apparatus according to claim 12, wherein the plurality of optical sensors are configured to selectively activate a first light source to illuminate the first tray with a first emission in response to a closure of the storage compartment being opened.

14. The lighting apparatus according to claim 13, wherein the plurality of optical sensors are configured to selectively activate a second light source to illuminate the first tray with a second emission in response to the foreign object proximate a first opening of the first tray.

15. The lighting apparatus according to claim 14, wherein the plurality of optical sensors are configured to selectively activate a third light source to illuminate the second tray with a third emission in response to an object proximate a second opening of the second tray.

16. A method for controlling a lighting apparatus for a vehicle compartment comprising:
emitting a detecting emission;
measuring a detection signal based on a reflection of the detecting emission;
identifying an orientation of a closure member of the compartment based on a magnitude of the detection signal;
activating a light source to emit a first emission in response to the closure member being opened;
identifying a presence of an object proximate an opening of the compartment; and
selectively activating the light source to emit a second emission in response to identifying the presence of the object.

17. The method according to claim 16, wherein the identifying of the orientation of the closure corresponds to receiving the detection signal having a first magnitude, the first magnitude being less than a first threshold.

18. The method according to claim 17, wherein the identifying the presence of the object in proximity to the compartment corresponds to receiving the detection signal having a second magnitude, the second magnitude being greater than the first magnitude and less than a second magnitude.

19. The method according to claim 17, further comprising controlling the light source at in an idle condition in response to the detection signal being greater than the second magnitude.

20. The method according to claim 19, wherein the idle condition corresponds to the light source being inactive in response to the closure being oriented in a closed orientation.

* * * * *